United States Patent
Zhang et al.

(10) Patent No.: US 12,361,288 B2
(45) Date of Patent: Jul. 15, 2025

(54) METHOD, DEVICE AND MEDIUM FOR DIAGNOSING AND OPTIMIZING DATA ANALYSIS SYSTEM

(71) Applicant: NEC CORPORATION, Tokyo (JP)

(72) Inventors: Ni Zhang, Beijing (CN); Xiaoyi Chen, Beijing (CN); Yang Zhao, Beijing (CN)

(73) Assignee: NEC CORPORATION, Tokyo (JP)

( * ) Notice: Subject to any disclaimer, the term of this patent is extended or adjusted under 35 U.S.C. 154(b) by 174 days.

(21) Appl. No.: 17/017,901

(22) Filed: Sep. 11, 2020

(65) Prior Publication Data

US 2021/0081800 A1 Mar. 18, 2021

(30) Foreign Application Priority Data

Sep. 12, 2019 (CN) .......................... 201910865445.9

(51) Int. Cl.
*G06N 3/082* (2023.01)
*G06N 3/047* (2023.01)
(Continued)

(52) U.S. Cl.
CPC ............. *G06N 3/082* (2013.01); *G06N 3/047* (2023.01); *G06N 7/01* (2023.01); *G06Q 20/4016* (2013.01)

(58) Field of Classification Search
CPC ...... G06N 3/082; G06N 7/005; G03N 3/0472; G06Q 20/4016
(Continued)

(56) References Cited

U.S. PATENT DOCUMENTS

| | | | |
|---|---|---|---|
| 10,162,850 B1* | 12/2018 | Jain | G06N 20/00 |
| 2006/0089753 A1* | 4/2006 | Eagen | G08B 13/1663 |
| | | | 701/1 |
| 2016/0246277 A1* | 8/2016 | Nikovski | G05B 19/0426 |

FOREIGN PATENT DOCUMENTS

| | | |
|---|---|---|
| JP | 2003-32253 A | 1/2003 |
| JP | 2018-529134 A | 10/2018 |

OTHER PUBLICATIONS

Gal et al., "Dropout as a Bayesian Approximation: Representing Model Uncertainty in Deep Learning", Proceedings of the 33rd International Conference on Machine Learning, New York, NY, USA 2016 (Year: 2016).*

(Continued)

*Primary Examiner* — Tsu-Chang Lee
(74) *Attorney, Agent, or Firm* — Sughrue Mion, PLLC

(57) ABSTRACT

Embodiments of the present disclosure provide method, device and computer storage medium for diagnosing and optimizing a data analysis system. The method disclosed herein comprises: obtaining information about an analysis engine in a data analysis system to be diagnosed and data to be diagnosed, the data to be diagnosed being associated with the analysis engine and comprising at least one of training data and prediction data for the analysis engine; determining a diagnosis engine corresponding to the analysis engine based on the received information; and providing a metric of uncertainty associated with at least one of the analysis engine and the data to be diagnosed by processing the data to be diagnosed with the diagnosis engine, the metric of uncertainty indicating a level of certainty for a prediction result obtained by processing the data to be diagnosed with the analysis engine. Based on this method, a diagnosis engine corresponding to an analysis engine can be used to determine an impact of a model or data to be diagnosed on accuracy of a prediction of an analysis engine of a data (Continued)

analysis system, thereby enabling a user to select a suitable data analysis model or to determine data to be diagnosed and to avoid possible defects.

16 Claims, 8 Drawing Sheets

(51) Int. Cl.
*G06N 7/01* (2023.01)
*G06Q 20/40* (2012.01)

(58) Field of Classification Search
USPC .......................................................... 706/21
See application file for complete search history.

(56) References Cited

OTHER PUBLICATIONS

Bernieri et al., "A Neural Network Approach for Identification and Fault Diagnosis on Dynamic Systems", IEEE Transactions on Instrumentation and Measurement, vol. 43, No. 6, Dec. 1994 (Year: 1994).*
Communication dated Jun. 25, 2024, issued in Japanese Application No. 2020-152861.

* cited by examiner

METHOD, DEVICE AND MEDIUM FOR DIAGNOSING AND OPTIMIZING DATA ANALYSIS SYSTEM

FIELD

Embodiments of the present disclosure generally relate to the field of artificial intelligence, and more specifically, to a method, a device and a computer storage medium for diagnosing and optimizing a data analysis system.

BACKGROUND

With continuous development of computer technologies, a data analysis system has been widely used in people's daily life. Analysis engines such as deep neural networks are now becoming more and more popular in various fields, such as image recognition, speech recognition and object detection. Usually, an analysis engine needs to be trained with training data, but the analysis engine can barely achieve the same performance in a prediction process. There might be a plurality of reasons for the performance degradation of an analysis engine at a prediction stage, and it is therefore difficult for developers to locate and remedy the defects of analysis engines, which is undesirable.

SUMMARY

Embodiments of the present disclosure provide a solution for diagnosing and optimizing a data analysis system.

In accordance with the first aspect of the present disclosure, there is provided a method for diagnosing a data analysis system, comprising: obtaining information about an analysis engine in a data analysis system to be diagnosed and data to be diagnosed, the data to be diagnosed being associated with the analysis engine and comprising at least one of training data and prediction data for the analysis engine; determining a diagnosis engine corresponding to the analysis engine based on the received information; and providing a metric of uncertainty associated with at least one of the analysis engine and the data to be diagnosed by processing the data to be diagnosed with the diagnosis engine, the metric of uncertainty indicating a level of certainty for a prediction result obtained by processing the data to be diagnosed with the analysis engine.

In accordance with the second aspect of the present disclosure, there is provided a method for optimizing a data analysis system, comprising: providing a diagnosis system with information about an analysis engine of the data analysis system and data to be diagnosed, the data to be diagnosed being associated with the analysis engine and comprising at least one of training data and prediction data for the analysis engine; receiving, from the diagnosis system, a metric of uncertainty associated with at least one of the analysis engine and the data to be diagnosed, the metric of uncertainty indicating a level of certainty for a prediction result obtained by processing the data to be diagnosed with the analysis engine; and updating at least one of the analysis engine and the data to be diagnosed based on the metric of uncertainty.

In accordance with the third aspect of the present disclosure, there is provided a device for diagnosing a data analysis system, comprising: at least one processing unit; at least one memory coupled to the at least one processing unit and having instructions stored thereon executable by the at least one processing unit, the instructions, when executed by the at least one processing unit, causing the device to perform acts comprising: obtaining information about an analysis engine in a data analysis system to be diagnosed and data to be diagnosed, the data to be diagnosed being associated with the analysis engine and comprising at least one of training data and prediction data for the analysis engine; determining a diagnosis engine corresponding to the analysis engine based on the received information; and providing a metric of uncertainty associated with at least one of the analysis engine and the data to be diagnosed by processing the data to be diagnosed with the diagnosis engine, the metric of uncertainty indicating a level of certainty for a prediction result obtained by processing the data to be diagnosed with the analysis engine.

In accordance with the fourth aspect of the present disclosure, there is provided a device for optimizing a model analysis system, comprising: at least one processing unit; at least one memory coupled to the at least one processing unit and having instructions stored thereon executable by the at least one processing unit, the instructions, when executed by the at least one processing unit, causing the device to perform acts comprising: there is provided a method for optimizing a data analysis system, comprising: providing a diagnosis system with information about an analysis engine of the data analysis system and data to be diagnosed, the data to be diagnosed being associated with the analysis engine and comprising at least one of training data and prediction data for the analysis engine; receiving, from the diagnosis system, a metric of uncertainty associated with at least one of the analysis engine and the data to be diagnosed, the metric of uncertainty indicating a level of certainty for a prediction result obtained by processing the data to be diagnosed with the analysis engine; and updating at least one of the analysis engine and the data to be diagnosed based on the metric of uncertainty.

In accordance with the fifth aspect of the present disclosure, there is provided a computer readable storage medium comprising computer readable program instructions stored thereon, and the computer readable program instructions are used perform the method of the first aspect.

In accordance with the sixth aspect of the present disclosure, there is provided a computer readable storage medium comprising computer readable program instructions stored thereon, and the computer readable program instructions are used perform the method of the second aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION OF EMBODIMENTS

Figure 1:
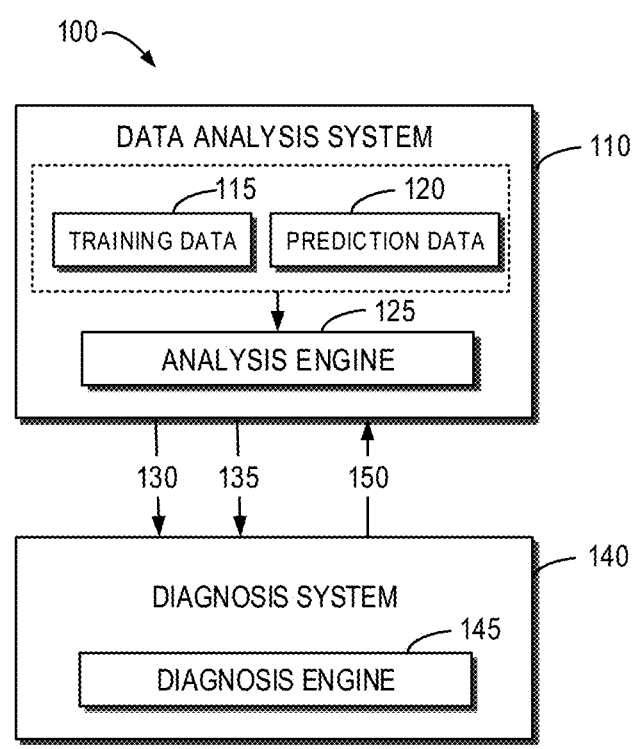
FIG. 1 illustrates a schematic diagram of an environment in which embodiments of the present disclosure may be implemented.

Preferred embodiments of the present disclosure will be described in more detail below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second" and so on can refer to same or different objects. The following text also can include other explicit and implicit definitions.

As described above, with continuous development of computer technologies, a data analysis system has been widely used in people's daily lives. Analysis engines such as deep neural networks are now becoming more and more popular in various fields, such as image recognition, speech recognition and object detection. People are increasingly relying on data prediction results provided by data analysis systems. In key areas such as medical diagnosis, financial investment, business and public decision-making, the reliability and stability of the prediction results would be particularly important. However, during the prediction process, the analysis engine can barely achieve the same performance as the training phase. Therefore, people are now paying more attention to how to locate the defects of the analysis engine or the training data/prediction data in a data analysis system, and improve them accordingly.

Embodiments of the present disclosure provide a solution for diagnosing a data analysis system. In the solution, information about an analysis engine in a data analysis system to be diagnosed and data to be diagnosed may first be obtained, wherein the data to be diagnosed are associated with the analysis engine and comprise at least one of training data and prediction data for the analysis engine. A diagnosis engine corresponding to the analysis engine may then be determined based on the received information. Further, a metric of uncertainty associated with at least one of the analysis engine and the data to be diagnosed may be provided by processing the data to be diagnosed with the diagnosis engine. The metric of uncertainty may indicate a level of certainty for a prediction result obtained by processing the data to be diagnosed with the analysis engine. With such an approach, the diagnosis engine corresponding to the analysis engine can be used to determine the impact of the model or the data to be diagnosed (including training data and prediction data) on the accuracy of the prediction of the analysis engine of the data analysis system. Further, users may then be enabled to determine possible defects in the model or the data to be diagnosed. In addition, with the help of a separate diagnosis engine to diagnose the data analysis system, it is also possible to provide developers with diagnostic suggestions for the data analysis system if the data analysis system runs abnormally.

Other embodiments of the present disclosure provide a solution for optimizing a data analysis system. In the solution, information about an analysis engine of a data analysis system and data to be diagnosed associated with the analysis engine may first be sent to a diagnose system, wherein the data to be diagnosed comprise at least one of training data and prediction data for the analysis engine. A metric of uncertainty associated with at least one of the analysis engine and the data to be diagnosed is then received from the diagnosis system, wherein the metric of uncertainty may indicate a level of certainty for a prediction result obtained by processing the data to be diagnosed with the analysis engine. The analysis engine is then updated based on the metric of uncertainty. In this way, the analysis engine can be updated based on the metric of uncertainty determined by the analysis engine, thereby improving the performance of the data analysis system.

Example Environment

Embodiments of the present disclosure will be described in detail below with reference to the drawings. FIG. 1 illustrates a schematic diagram of an example environment 100 in which embodiments of the present disclosure may be implemented. As shown in FIG. 1, the example environment 100 comprises a data analysis system 110 and a diagnosis system 140. The data analysis system 110 comprises an analysis engine 125, which is capable of learning from existing data certain knowledge and capabilities for processing new data. The analysis engine 125 may be designed to execute various tasks, such as image classification, object detection, speech recognition, machine translation, content filtering, and so on. Examples of the analysis engine 125 comprise, but are not limited to, various types of deep neural networks (DNN), convolutional neural networks (CNN), support vector machines (SVM), decision trees, random forest models, and so on.

As shown in FIG. 1, the data analysis system 110 further comprises training data 115 for training the analysis engine 125 and prediction data 120 for prediction by the analysis engine 125. In some embodiments, the training data 115 and prediction data 120 applied to the analysis engine 125 are data such as images, medical data, business data, etc., and the analysis engine 125 can provide results obtained through data analysis (also referred to as prediction results). Specifically, the analysis engine 125 may perform at least one of the following operations on input data (including the training data 115 and the prediction data 120): prediction, recognition, classification, model analysis, feature detection, and feature extraction. In some embodiments, the analysis engine 125 may provide a recognition prediction for the input data. For example, when the input data is an image, the prediction may be a recognition result for the image (for example, an object comprised in the image is a cat or a dog). In some embodiments, the analysis engine 125 may provide a prediction for the input data. For example, when the input data is business data, the prediction may be a prediction analysis by the analysis engine 125 on sales, customer churn rate, advertisement click rate, etc.

The data analysis system 110 can provide the diagnosis system 140 with information 130 related to the analysis engine 125 and data 135 to be diagnosed via an interface between the diagnosis system 140 and the data analysis system 110, wherein the data to be diagnosed comprise at least one of the training data 115 and prediction data 120. In some embodiments, the interface between the data analysis system 110 and the diagnosis system 140 may be a physical communication interface. Alternatively, the interface between the data analysis system 110 and the diagnosis system 140 may also be a data communication interface implemented through software. In some embodiments, the information 130 may comprise information indicative of a type and a network structure of the analysis engine 125. For example, in a case that the analysis engine 125 comprises a deep neural network, the information 130 may comprise information indicative of a specific structure of the deep neural network. For example, the information may indicate that the neural network comprises 3 layers of MLP (Multi-layer Perceptron), and the number of hidden units in each layer is 45, 135 and 405 respectively. It should be understood that the information 130 may not comprise information regarding specific weights of the analysis engine 125.

As shown in FIG. 1, the diagnosis system 140 comprises a diagnosis engine 145. Similar to the analysis engine 125, the diagnosis engine 145 can learn from existing data certain knowledge and capabilities for processing new data. In some embodiments, the diagnosis engine 145 can provide the degree of uncertainty (hereinafter referred to as "a metric of uncertainty") regarding the prediction result in a quantitative manner. In some embodiments, in response to the analysis engine 125 including a neural network module, the diagnosis system 140 may construct the neural network module based on the received information 130 related to the analysis engine 125, and use probabilistic inference to update the neural network module as a part of the diagnosis engine 145. In the diagnosis engine 145, a weight is indicated in a specific distribution instead of a fixed value. In some embodiments, for example, the diagnosis engine 145 may comprise the Bayesian Neural Network (BNN). The diagnosis system 140 may provide a metric of uncertainty 150 by processing the data 135 to be diagnosed with the diagnosis engine 145. The data analysis system 110 may update the analysis engine accordingly after receiving the metric of uncertainty 150. A process of generating the metric of uncertainty 150 by the diagnosis system 140 and a process of the data analysis system 110 optimizing the analysis engine 125 based on the metric of uncertainty 150 determined by the diagnosis system 140 will be described in detail below.

Diagnosing a Data Analysis System

Figure 2:
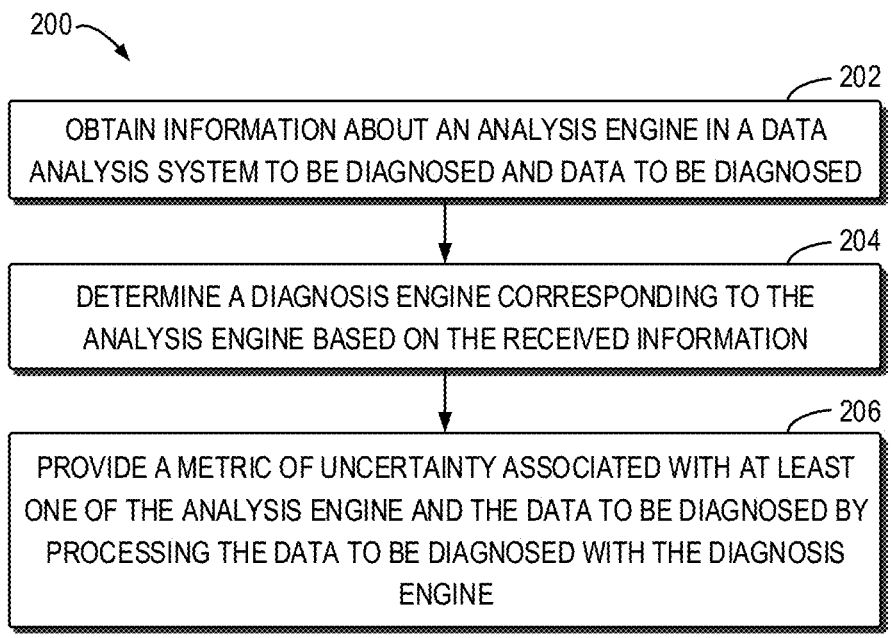
FIG. 2 illustrates a flowchart of a process of diagnosing a data analysis system according to an embodiment of the present disclosure.
Figure 3:
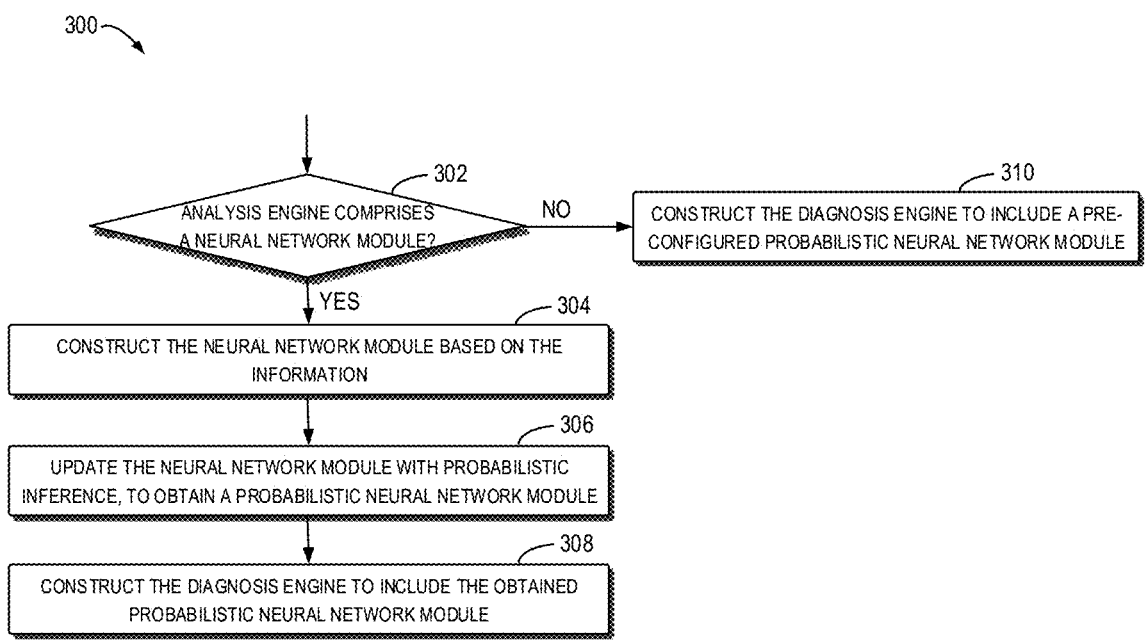
FIG. 3 illustrates a flowchart of a process of determining a diagnosis engine according to an embodiment of the present disclosure.

Hereinafter, a process for diagnosing a data analysis system will be described in more detail with reference to FIGS. 2 to 4. FIG. 2 illustrates a flowchart of a process 200 for diagnosing a data analysis system according to some embodiments of the present disclosure. The process 200 may be implemented by the diagnosis system 140 of FIG. 1. For ease of discussion, the process 200 will be described in conjunction with FIG. 1.

As shown in FIG. 2, at block 202, the diagnosis system 140 obtains information 130 about the analysis engine 125 in the data analysis system 110 to be diagnosed and the data 135 to be diagnosed, wherein the data 135 to be diagnosed is associated with the analysis engine 125 and comprise at least one of training data 115 and prediction data 120 for the analysis engine 125.

In some embodiments, the data analysis system 110 may, for example, be deployed on a cloud platform, wherein the information 130 about the analysis engine 125 and the training data 115 and the prediction data 120 will also be stored on the cloud platform accordingly. For example, the user may access the cloud platform to perform corresponding data analysis tasks with the data analysis system 110.

In some embodiments, the diagnosis system 140 can be deployed on the same cloud platform as the data analysis system 110, such that the diagnosis system 140 can have an access to information about the analysis engine 125 and data 135 to be diagnosed by means of the storage of the cloud platform.

In some embodiments, the diagnosis system 140 may also be deployed to be communicatively coupled with the data analysis system 110, such that the information about the analysis engine 125 and the data 135 to be diagnosed can be received from the data analysis system 110 via a wired or wireless network.

At block 204, the diagnosis system 140 determines the diagnosis engine 145 corresponding to the analysis engine 125 based on the received information. In some embodiments, the diagnosis engine 145 may, for example, be constructed to comprise a pre-configured BNN module.

A process of the block 204 will be described below with reference to FIG. 3. FIG. 3 illustrates a flowchart of a process 300 of determining the diagnosis engine 145 according to an embodiment of the present disclosure. As shown in FIG. 3, at block 302, the diagnosis system 140 may determine whether the analysis engine 125 comprises a neural network module based on the received information 130. In response to determining at block 302 that the analysis engine 125 comprises a neural network module, the process 300 proceeds to block 304 where the diagnosis system 140 may construct a neural network module based on the received information. For example, the information 130 may indicate a number of layers and nodes in the neural network module, and the diagnosis system 140 may construct an untrained neural network module based on the information 130.

At block 306, the diagnosis system 140 may update the neural network module with probabilistic inference to obtain a probabilistic neural network module. Unlike traditional deterministic neural networks in which parameters are expressed by deterministic numerical values, parameters in the probabilistic neural networks are expressed as distributions, such that the probabilistic neural network module can better determine a metric of uncertainty for the prediction results. In some embodiments, the diagnosis system 140 may update the neural network module by means of Bayesian inference, such that all probabilistic data network modules comprise BNN. Alternatively, the diagnosis system 140 may also update the neural network module via frequency inference. At block 308, the diagnosis system 140 constructs the diagnosis engine 145 to comprise the obtained probabilistic neural network module.

Alternatively, if it is determined at block 302 that the analysis engine 125 fails to comprise a neural network module, the process 300 proceeds to block 310, where the diagnosis system 140 constructs the diagnosis engine 145 to comprise a pre-configured probabilistic neural network module.

Continuing to refer to FIG. 2, at block 206, the diagnosis system 140 provides the metric of uncertainty 150 associated with at least one of the analysis engine 125 and the data 135 to be diagnosed by processing the data 135 to be diagnosed by using the diagnosis engine 145, and the metric of uncertainty 150 indicates a degree of certainty of the prediction result obtained by a processing of the analysis engine 125 to the data to be diagnosed 135.

In some embodiments, the data 135 to be diagnosed comprises both the training data 115 and the prediction data 120. The metric of uncertainty 150 determined by the diagnosis system 140 may comprise at least one of a metric model uncertainty, a metric of data uncertainty, and a metric of distribution uncertainty.

The metric of model uncertainty at least indicates an impact of a fitting degree between complexity of the analysis engine 125 and scale of the data 135 to be diagnosed on performance of the analysis engine 125. For example, the metric of model uncertainty may indicate whether scale of the training data 115 matches with complexity of the analysis engine 125. For example, in a case that the training data 115 is larger in scale but the model comprised in the analysis engine 125 is relatively simple, the fitting degree would be relatively poor.

The metric of data uncertainty at least indicates an impact of quality of the data 135 to be diagnosed on performance of the analysis engine. For example, the quality of the data 135 to be diagnosed may indicate at least one of: whether the data 135 to be diagnosed are easy to predict, whether the data 135 have too much noise, whether the data 135 comprise much missing data, and so on.

The metric of distribution uncertainty at least indicates an impact of a matching degree between the prediction data 120 and distribution of the training data 115 on performance of the analysis engine. For example, as the analysis engine 125 is trained by the training data 115, the distribution of the prediction data 120 and the distribution the training data 115 could be quite different.

A process of determining model uncertainty, data uncertainty and distribution uncertainty will be introduced below with the BNN as an example. For the BNN module comprised in the diagnosis engine 145, the BNN may for example be identified with $\hat{y}=f_\theta(x)$, where $\theta$ represents parameters of the network, x represents input to the network, and $\hat{y}$ represents output of the network.

In addition, in order to separate the three metrics of uncertainty, the likelihood function of output y can be decomposed according to Equation (1):

$$p(y|x^*, D) = \int \underbrace{p(y|\phi, \epsilon)}_{1} \underbrace{p(\phi|x^*, \theta)}_{2} \underbrace{p(\theta|D)}_{3} \underbrace{p(\epsilon|D)}_{4} d\phi d\theta d\epsilon, \quad (1)$$

wherein x* represents data items in the prediction data 120, D represents the training data 115, and the third item $p(\theta|D)$ in formula (1) represents posterior distribution of the model parameters. In addition, $\varphi$ indicates whether x* matches with the distribution of D, and the second term $p(\phi|x^*, \theta)$ in formula (1) is assumed to follow a Bernoulli distribution. If $\varphi=1$, it means that x* complies with the distribution of D. If $\varphi=0$, it means x* fails to comply with the distribution of D. $\epsilon$ indicates a metric of data uncertainty, where the fourth term $p(\epsilon|D)$ in formula (1) represents the posterior distribution of $\epsilon$. The first term $p(y|\phi, \epsilon)$ in formula (1) represents the distribution of output y.

In some embodiments, for the BNN module comprised in the diagnosis engine 145, to facilitate the BNN to distinguish whether the data comply with a specific distribution, the BNN can be trained such that:

(1) The BNN has a same ability to predict data as the analysis engine 125. In some embodiments, the training objective can be achieved by introducing objective function of the conventional BNN;

(2) The BNN can also determine whether input data comply with the distribution of training data D. In some embodiments, the training target can construct negative samples by adding random noise to training data complying with the distribution, and then train the BNN with the combination of positive samples and negative samples, so that the BNN can distinguish whether certain input data comply with a specific distribution.

In some embodiments, the metric of uncertainty can be represented by one of: mutual information (MI), entropy or variance. Compared with expressing individual uncertainties by absolute values, MI can better reflect the possible relation between metric of uncertainty, metric of data uncertainty, and metric of distribution uncertainty of the model.

In some embodiments, the diagnosis system 140 can determine a total metric of uncertainty for the diagnosis engine 145 by processing the data 135 to be diagnosed with the diagnosis engine 145; and provide at least one of the following items based on the total metric of uncertainty: model uncertainty, data uncertainty and distribution uncertainty. Specifically, metric of model uncertainty may be determined through Equation (2):

$$MI(Y, \theta | \mathcal{D}) = -\int \log p(Y|D) dp(Y|D) - \mathbb{E}_{q(\theta|\mathcal{D})}(-\int \log p(Y|D,\theta) dp(Y|D,\theta)). \quad (2)$$

The metric of data uncertainty may be determined through Equation (3):

$$MI(Y, \epsilon | \mathcal{D}) = -\int \log p(Y|\mathcal{D}) dp(Y|\mathcal{D}) - \mathbb{E}_{q(\epsilon|\mathcal{D})}(-\int \log p(y|\mathcal{D},\epsilon) dp(y|\mathcal{D},\epsilon)). \quad (3)$$

The metric of distribution uncertainty may be determined through Equation (4):

$$MI(Y, \phi | \mathcal{D}) = -\int \log p(Y|\mathcal{D}) dp(Y|\mathcal{D}) - \mathbb{E}_{q(\phi|\mathcal{D})}(-\int \log p(y|\mathcal{D},\phi) dp(y|\mathcal{D},\phi)). \quad (4)$$

In formulas (2) to (4), $-\int \log p(Y|\mathcal{D}) dpt(Y|\mathcal{D})$ represents the total metric of uncertainty of the BNN, and $\mathbb{E}_{q(\theta|\mathcal{D})}(-\int \log p(Y|\mathcal{D}, \theta) dp(Y|\mathcal{D}, \theta))$, in formula (2) represents the remaining metric of uncertainty after knowing the network parameter $\theta$, the $\mathbb{E}_{q(\epsilon|\mathcal{D})}(-\int \log p(y|\mathcal{D}, \epsilon) dp(y|\mathcal{D}, \epsilon))$, in formula (3) represents the remaining metric of uncertainty after knowing the data uncertainty information, and $\mathbb{E}_{q(\phi|\mathcal{D})}(-\int \log p(y|\mathcal{D}, \phi) dp(y|\mathcal{D}, \phi))$, in formula (4) represents the remaining metric of uncertainty after knowing the data distribution information.

For each item in formulas (2) to (4), after the BNN is trained using the training data 115, $p(y|\phi, \epsilon)$, $p(\phi|x^*, \theta)$, $p(y|\mathcal{D})$ and $p(\epsilon|\mathcal{D})$ can be determined, and further, based on the disassembly of the likelihood function in formula (1), $p(y|D, \theta)$, $p(y|D, \phi)$ and $p(y|\mathcal{D}, \epsilon)$ can be further determined, and, and then the values of the metric of model uncertainty, the metric of data uncertainty and the metric of distribution uncertainty can be determined according to formulas (2) to (4).

In some embodiments, the diagnosis system 140 may send the determined metric of uncertainty 150 to the data analysis system 110, such that the data analysis system 110 can adjust at least one of the analysis engine 125 and the data 135 to be diagnosed based on the metric of uncertainty 150.

In some embodiments, the diagnosis system 140 may also provide instructions for adjusting at least one of the analysis engine 125 and the data 135 to be diagnosed. As discussed above, different metrics of uncertainty indicate the influence of different factors on the prediction performance of the model. For example, if the metric of model uncertainty is relatively large, the diagnosis system 140 may provide an indication of increasing training data. If the metric of data uncertainty is relatively large, the diagnosis system 140 may for example provide an indication of discarding the data to be diagnosed. If the metric of distribution uncertainty is relatively large, the diagnosis system 140 may provide an instruction to retrain the analysis engine 125 with the prediction data 120. In some embodiments, the diagnosis system 140 may compare the determined metrics of uncertainty with a predetermined threshold, and provide the above-mentioned indications if it is determined that the metric of uncertainty is greater than the predetermined threshold.

In some embodiments, the diagnosis system 140 may also determine the metric of uncertainty with the maximum value from the metric of model uncertainty, the metric of data uncertainty, and the metric distribution uncertainty, and provide a corresponding indication of the determined metric of uncertainty. For example, if the metric of data uncertainty has the greatest value, the diagnosis system 140 may provide an indication of increasing the training data.

In some embodiments, the diagnosis system 140 may also provide an instruction of adjusting at least one of the analysis engine 125 and the data 135 to be diagnosed by comparing the metrics of uncertainty determined based on the training data 115 and the prediction data 120. Specifically, FIG. 4 illustrates a flowchart of a process of providing an adjustment instruction according to an embodiment of the present disclosure.

Figure 4:
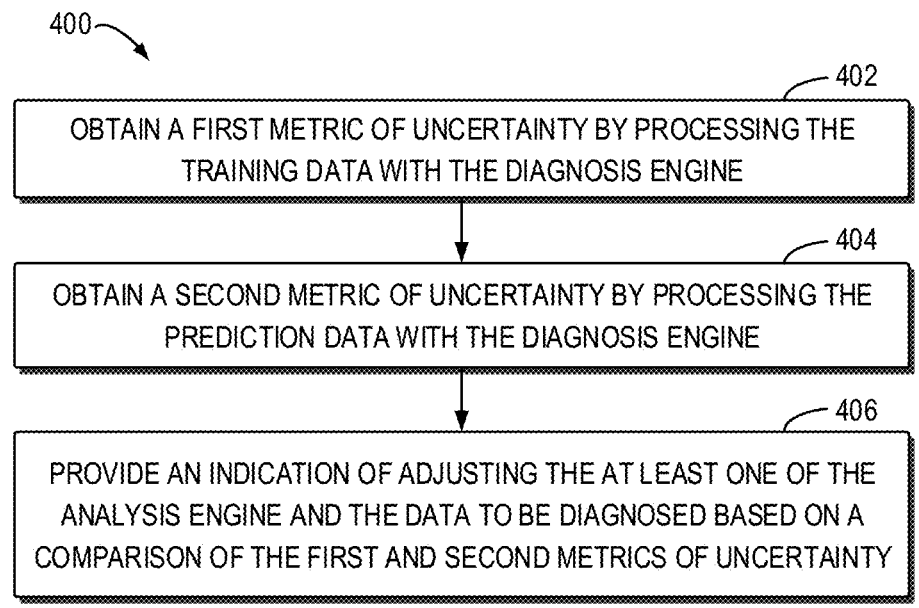
FIG. 4 illustrates a flowchart of a process of providing adjustment instructions according to an embodiment of the present disclosure.

As shown in FIG. 4, at block 402, the diagnosis system 140 may obtain a first metric of uncertainty by processing the training data 115 with the diagnosis engine 145. For example, the training data 115 may be the data of the first quarter, and the diagnosis system 140 may determine, based on the training data 115, that the metric of model uncertainty related to the training data of the first quarter is 0.6, the metric of data uncertainty is 1.2, and the metric of distribution certainty is 0.3.

At block 404, the diagnosis system 140 may obtain a second metric of uncertainty by processing the prediction data 120 with the diagnosis engine 145. For example, the prediction data 120 may be the data of the second quarter to be predicted, and the diagnosis system 140 may determine, based on the prediction data 120, that the metric of model uncertainty related to the prediction data of the second quarter is 0.5, and the metric of data uncertainty is 1.0, and the metric of distribution uncertainty is 0.6.

At block 406, the diagnosis system 140 may provide an indication of adjusting at least one of the analysis engine 125 and the data 135 to be diagnosed based on comparing the first and second metrics of uncertainty. For example, based on comparing the first metric of uncertainty related to the training data of the first quarter and the second metric of uncertainty related to the prediction data of the second quarter, it can be found that the metric of distribution uncertainty has the largest change (0.3). In this case, the diagnosis system 140 may, for example, provide an instruction of retraining the analysis engine 125 with the prediction data 120.

In some embodiments, the input of the diagnosis engine 145 comprises a plurality of data items, which are associated with different features, respectively. For example, in a scenario for predicting household power consumption, data items for training and/or the data items for prediction may comprise multiple data items associated with different features, such as temperature of different rooms (e.g., a bedroom, a living room, a kitchen), the humidity of different rooms (e.g., the bedroom, the living room, the kitchen, etc.), outdoor temperature and outdoor humidity, etc. These different data items can for example be collected by sensors placed in different positions.

In some embodiments, the diagnosis system 140 may also determine, based on the metric of uncertainty, contribution of at least one data item of the plurality of data items to the metric of uncertainty. For example, for a specific metric of uncertainty, the contribution of a specific data item to the metric of uncertainty (hereinafter also referred to as a metric of feature uncertainty) can be determined as:

$$\frac{\partial u}{\partial x_i^j}, \quad (5),$$

where u is the metric of uncertainty, and $x_i^j$ is the $j^{th}$ feature for the $i^{th}$ input. Considering that the contribution of a specific data item to the metric of uncertainty determined based on each input may be different, the contribution of at least one data item among multiple data items to the metric of uncertainty can be determined by averaging as follows, $$\frac{1}{N}\sum_i \left|\frac{\partial u}{\partial x_i^j}\right|, \quad (6),$$

where N represents the number of inputs. For example, for the metric of data uncertainty, N can represent the number of training samples.

Figure 5:
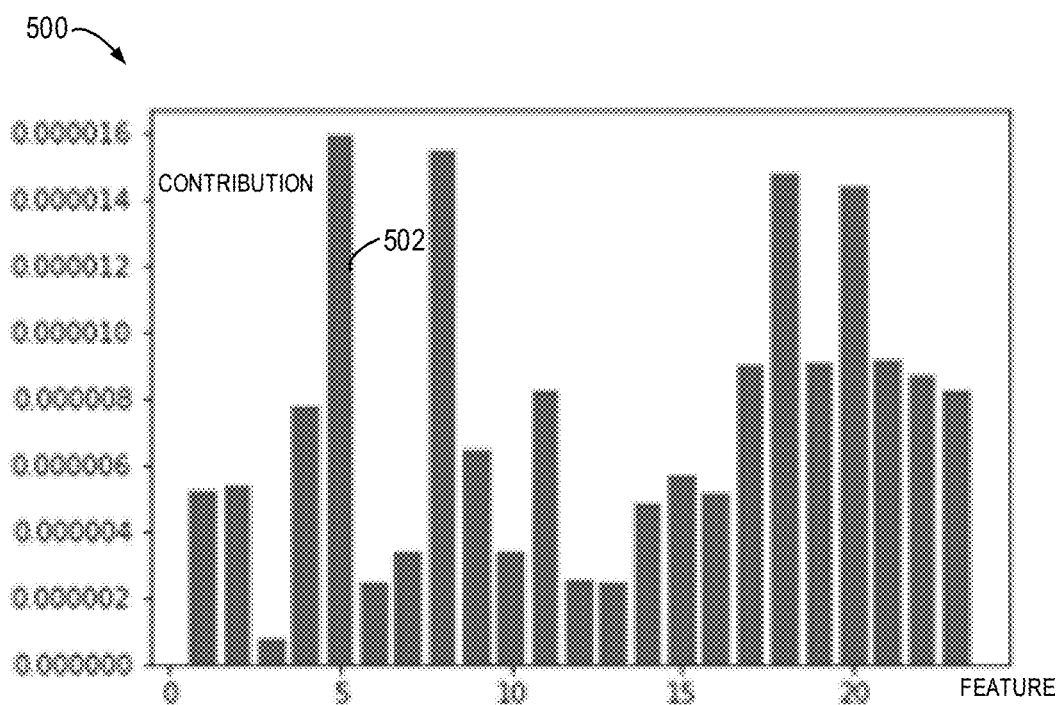
FIG. 5 illustrates a schematic diagram of the distribution of metrics of uncertainty in different features according to an embodiment of the present disclosure.

For example, FIG. 5 illustrates a schematic diagram 500 of the contribution of data items associated with different features to the metric of distribution uncertainty according to an embodiment of the present disclosure. As shown in FIG. 5, in this example, the input of the diagnosis engine 145 comprises data items associated with 23 features, and each data item may have a different contribution 502 to the metric of distribution uncertainty. For example, in this example, the data item corresponding to the fifth feature makes the greatest contribution.

In some embodiments, the diagnosis system 140 may also provide an instruction of adjusting at least one of the multiple data items based on the determined contribution of the at least one data item to the metric of uncertainty. For example, in the example of FIG. 5, the diagnosis system 140 may provide an instruction of adjusting the data item corresponding to the fifth feature based on the greatest contribution of the data item corresponding to the fifth feature, for example, to make the data analysis system 110 to remove the data item, to replace the data item, or to adjust the data item.

Based on the method for diagnosing a data analysis system described above, the embodiments of the present disclosure can use a diagnosis engine corresponding to an analysis engine to determine the impact of a model or data to be diagnosed (including training data and prediction data) on the accuracy of the prediction by the analysis engine of the data analysis system. This would in turn enable the user to select a suitable data analysis model in the data analysis system or to determine the possible defects of the data to be diagnosed. In addition, by using a separate diagnosis engine to diagnose the data analysis system, it is possible to provide developers with diagnostic suggestions for the data analysis system when the data analysis system runs abnormally.

Optimizing a Data Analysis System

Figure 6:
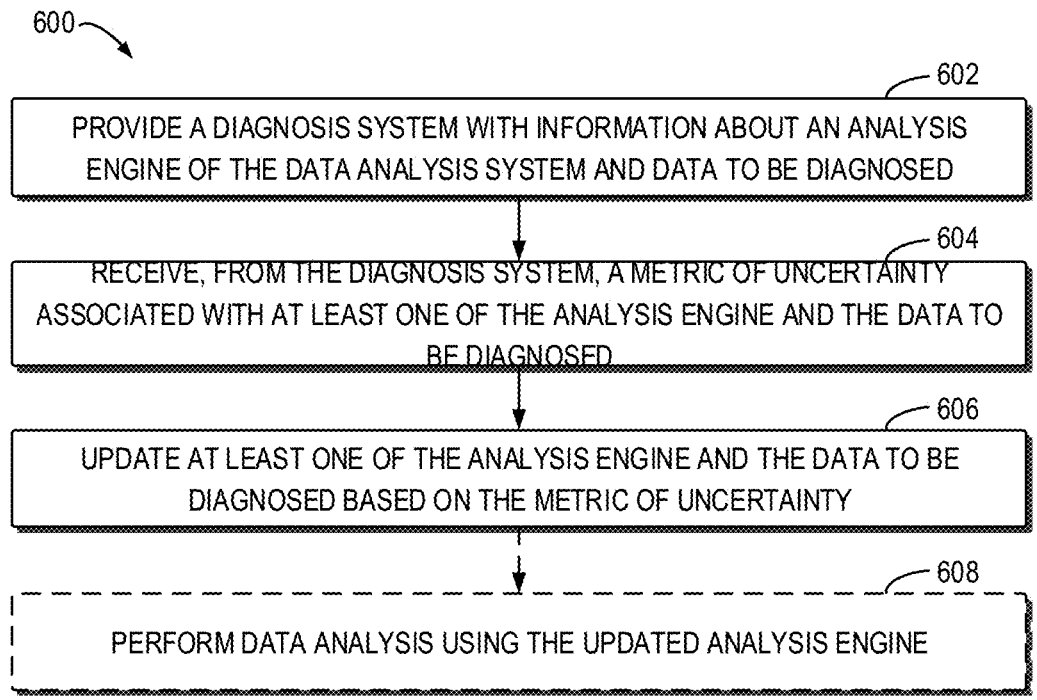
FIG. 6 illustrates a flowchart of a process of optimizing a data analysis system according to an embodiment of the present disclosure.

According to another aspect of the present disclosure, embodiments of the present disclosure also provide a method for optimizing a data analysis system. FIG. 6 illustrates a flowchart of a process 600 of optimizing a data analysis system according to an embodiment of the present disclosure. The process 600 can be implemented by the data analysis system 110 of FIG. 1. For ease of discussion, the process 600 will be described with referring to FIG. 1.

At block 602, the data analysis system 110 provides the diagnosis system 140 with information 130 about the analysis engine 125 in the data analysis system 110 and the data 135 to be diagnosed, wherein the data 135 to be diagnosed are associated with the analysis engine 125 and comprise at least one of data the training data 115 and the prediction data 120 for the analysis engine 125. As described above with reference to block 202 in the process 200, in some examples, the data analysis system 110 may provide the information 130 and the data 135 to be diagnosed to the diagnosis system 140 via a wired or wireless network. Alternatively, the data analysis system 110 and the diagnosis system 140 may be configured in the same cloud platform, for example, and the diagnosis system 140 may obtain the information 130 and the data 135 to be diagnosed from the cloud platform.

At block 604, the data analysis system 110 receives from the diagnosis system 140 the metric of uncertainty 150 associated with at least one of the analysis engine 125 and the data 135 to be diagnosed, wherein the metric of uncertainty 150 indicates a level of certainty of the prediction result obtained by processing the data 135 to be diagnosed with the analysis engine 125. The process of determining the metric of uncertainty 150 has been described above with reference to FIGS. 2 to 5, and the data analysis system 110 may receive the metric of uncertainty 150 from the diagnosis system 140.

At block 606, the data analysis system 110 updates at least one of the analysis engine 125 and the data 135 to be diagnosed based on the metric of uncertainty 150.

In some embodiments, the method 600 may also comprise a further block 608, where the data analysis system 110 may utilize the updated analysis engine 125 for data analysis. Specifically, the data analysis system 110 may receive new data to be analyzed, and process the new data to be analyzed with the updated analysis engine 125 so as to provide predictions for the new data to be analyzed.

In some embodiments, the received metric of uncertainty 150 may comprise a metric of model uncertainty, wherein the metric of model uncertainty at least indicates an impact of a fitting degree between complexity of the analysis engine and a scale of the data to be diagnosed on performance of the analysis engine. In some embodiments, the data analysis system 110 may compare the metric of model uncertainty with a predetermined threshold. If it is determined that the metric of model uncertainty is greater than the predetermined threshold, the data analysis system 110 may update the analysis engine 125 by training the analysis engine 125 with additional training data. In this way, the influence of the metric of model uncertainty on the performance of the analysis engine 125 can be reduced.

In some embodiments, the received metric of uncertainty may comprise a metric of data uncertainty, wherein the metric of data uncertainty at least indicates an impact of quality of the data 135 to be diagnosed on performance of the analysis engine 125. In some embodiments, the data analysis system 110 may compare the metric of data uncertainty with a predetermined threshold. If it is determined that the metric of data uncertainty is greater than the predetermined threshold, the data analysis system 110 may, for example, discard data on the diagnostic data 135 to ensure the quality of the training data.

In some embodiments, the received metric of uncertainty may comprise a metric of distribution uncertainty, wherein the metric of distribution uncertainty at least indicates an impact of a matching degree between a distribution of the prediction data and a distribution of the training data on performance of the analysis engine. In some embodiments, the data analysis system 110 may compare the metric of distribution uncertainty with a predetermined threshold. If it is determined that the metric of distribution uncertainty is greater than the predetermined threshold, the data analysis system 110 may use the prediction data 120 to retrain the analysis engine 125 so that the analysis engine 125 is capable of accurately analyzing the prediction data 120.

In some embodiments, as discussed above, the data analysis system 110 may also determine a metric of feature uncertainty from the received metric of uncertainty. The metric of uncertainty may indicate the contribution of at least one of the plurality of data items to the metric of uncertainty, and the input of the analysis engine may comprise multiple data items which are associated with different features, respectively. Determination of the metric of feature uncertainty can refer to the process described above in relation to formulas (5) and (6), which will not be described in detail here. In some embodiments, the data analysis system 110 may compare the received metric of feature uncertainty with a predetermined threshold, and when the metric of feature uncertainty is greater than the predetermined threshold, the data analysis system 110 may perform at least one of: adding more data items to the input of the analysis engine; modifying the attribute (for example, granularity) of the data item corresponding to the feature; or discarding at least one data item. For example, in the example of FIG. 5, the data analysis system 110 may receive the metric of feature uncertainty corresponding to the fifth feature from the diagnosis system 140. If the metric of feature uncertainty is greater than the threshold, the data analysis system 110 may for example, discard the data item corresponding to the fifth feature from the prediction data 120, or replace the data item, thereby reducing the impact of the feature on the performance of the analysis engine 125.

Based on the method of optimizing a data analysis system described above, the embodiments of the present disclosure may update the analysis engine based on the metric of uncertainty determined by the analysis engine, thereby improving the performance of the data analysis system.

Example Applications

Application 1: Credit Card Fraud Analysis System

The method of diagnosing and optimizing a data analysis system discussed above can be applied to a credit card fraud analysis system. For example, a credit card fraud analysis system may comprise an analysis engine for receiving input of data items<example feature>associated with 25 features, and provide a prediction about a fraud. In a specific example, the analysis engine comprises a neural network composed of 3 layers of MLP, and the numbers of hidden units in each layer are 45, 135, and 405, respectively.

Figure 7A:
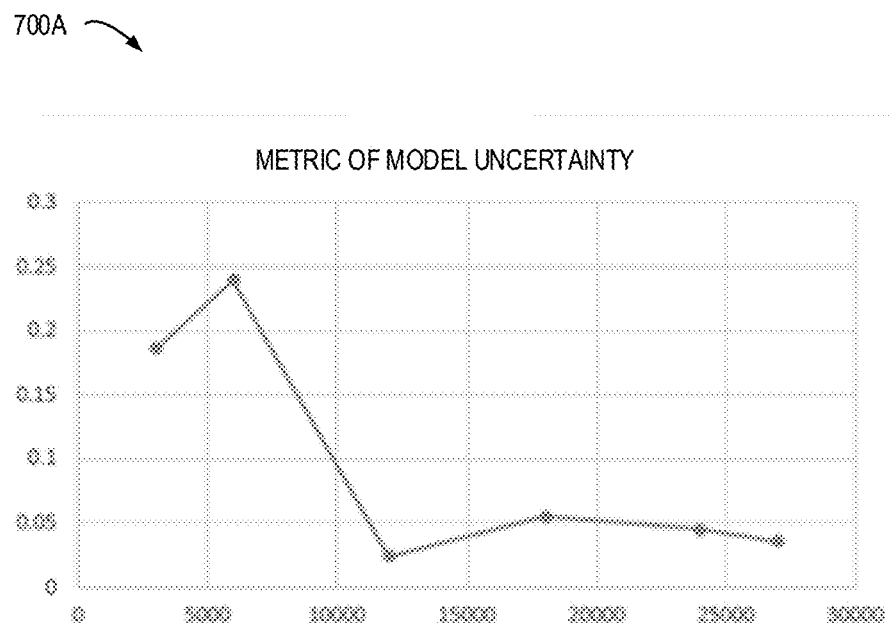
FIGS. 7A to 7F illustrate schematic diagrams of example metrics of uncertainty according to an embodiment of the present disclosure.

The analysis engine can determine the metric of model uncertainty corresponding to the scale of different training data by converting the neural network to a BNN based on Bayesian inference. For example, FIG. 7A shows a trend graph 700A of the metric of model uncertainty changing with scale of training data. It can be seen from the figure that as the training data increases, the overall metric of model uncertainty is in a decreasing trend. Therefore, with the trend, developers can determine whether they need to expand the scale of the training data or to reduce complexity of the neural network.

Figure 7B:
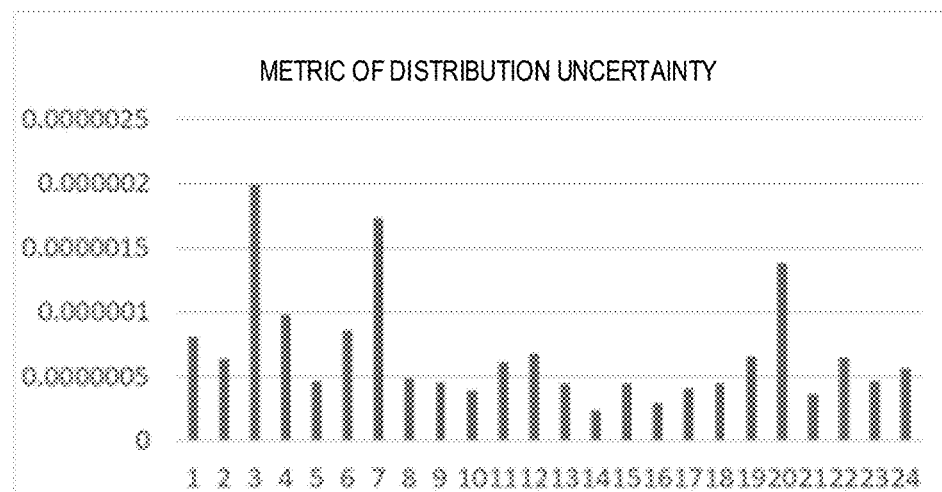

In addition, FIG. 7B also shows a schematic diagram 700B of the contribution of different features to the metric of distribution uncertainty (i.e., the metric of feature uncertainty). It can be seen from FIG. 7B that the metric of feature uncertainty associated with the third feature is the greatest one, so the data may indicate to the developer to check whether the collection of the data item corresponding to the third feature fails, or whether the data item corresponding to the third feature needs to be replaced or modified.

Based on the method for diagnosing and optimizing a data analysis system of the present disclosure, the current performance bottleneck of credit card fraud analysis systems can be determined, and the performance of the data analysis system can be improved accordingly.

Application 2: Channel Subscription Analysis System

The methods for diagnosing and optimizing data analysis systems discussed above can also be applied to a channel subscription analysis system. For example, a channel subscription analysis system may comprise an analysis engine for receiving input of data items associated with 23 features and provide predictions whether the user will subscribe to the channel. In a specific example, the analysis engine comprises a neural network composed of 2 layers of MLP, and the numbers of hidden units in each layer are 12 and 12 respectively.

Figure 7C:
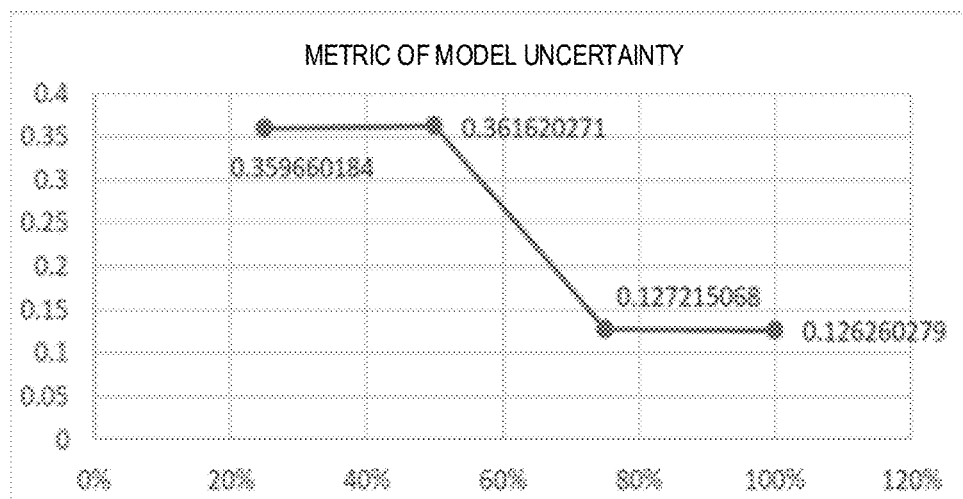

The analysis engine can determine the metric of model uncertainty corresponding to the scale of different training data by converting the neural network to a BNN based on Bayesian inference. For example, FIG. 7C shows a trend graph 700C of the metric of model uncertainty changing with scale of training data. It can be seen from the figure that as the training data increases, the overall metric of model uncertainty is in a decreasing trend. Therefore, with the trend, developers can determine whether they need to expand the scale of the training data or to reduce complexity of the neural network.

Figure 7D:
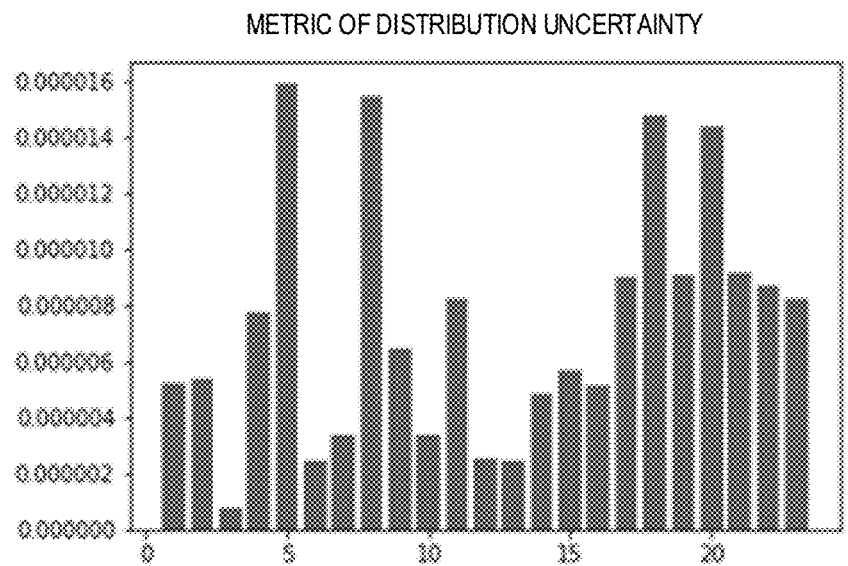

In addition, FIG. 7D also shows a schematic diagram 700D of the contribution of different features to the metric of distribution uncertainty (i.e., the metric of feature uncertainty). It can be seen from FIG. 7D that the metric of feature uncertainty associated with the fifth feature is the greatest one, so the data may indicate to the developer to check whether the collection of the data item corresponding to the fifth feature fails, or whether the data item corresponding to the fifth feature needs to be replaced or modified.

Based on the method for diagnosing and optimizing a data analysis system of the present disclosure, the current performance bottleneck of channel subscription analysis systems can be determined, and the performance of the data analysis system can be improved accordingly.

Application 3: Shopping Expenses Analysis System

The methods for diagnosing and optimizing data analysis systems discussed above can be applied to shopping expenses analysis systems. For example, a shopping expenses analysis system may comprise an analysis engine for receiving input of data items associated with 9 features and provide predictions of how much the user will spend for a shopping festival. In a specific example, the analysis engine comprises a neural network composed of 2 layers of MLP, and the numbers of hidden units in each layer are 128 and 256 respectively.

Figure 7E:
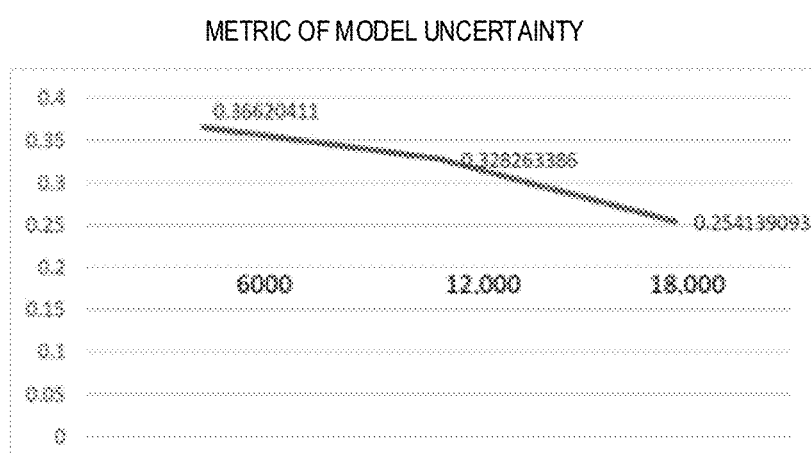

The analysis engine can determine the metric of model uncertainty corresponding to the scale of different training data by converting the neural network to a BNN based on Bayesian inference. For example, FIG. 7E shows a trend graph 700E of the metric of model uncertainty changing with scale of training data. It can be seen from the figure that as the training data increases, the overall metric of model uncertainty is in a decreasing trend. Therefore, with the trend, developers can determine whether they need to expand the scale of the training data or to reduce the complexity of the neural network.

Figure 7F:
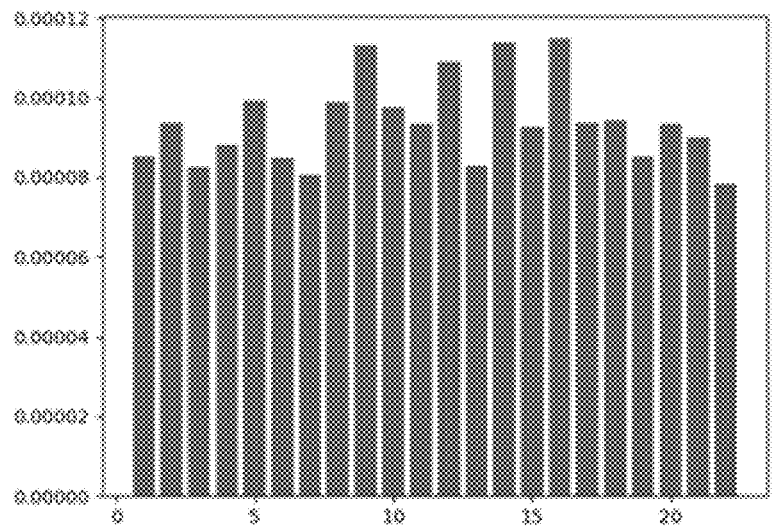

In addition, FIG. 7F also shows a schematic diagram 700F of the contribution of different features to the metric of distribution uncertainty (i.e., a metric of feature uncertainty). It can be seen from FIG. 7F that the metric of feature uncertainty associated with the first feature is the greatest one, so the data may indicate to the developer to check whether the collection of the data item corresponding to the first feature fails, or whether the data item corresponding to the first feature needs to be replaced or modified.

Based on the method for diagnosing and optimizing a data analysis system of the present disclosure, the current performance bottleneck of shopping expenses analysis systems can be determined, and the performance of the data analysis system can be improved accordingly.

It should be understood that the specific data analysis systems listed above are only illustrative and not intended to limit the present disclosure. The solutions for diagnosing and optimizing data analysis systems involved in the present disclosure can be applied to any suitable data analysis systems.

Example Device

Figure 8:
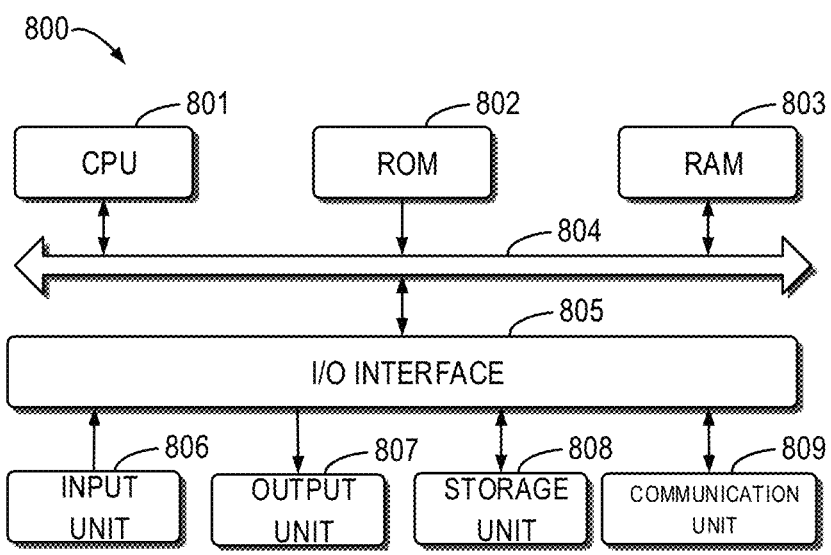
FIG. 8 illustrates a schematic block diagram of an example device which can be used to implement embodiments of the present disclosure.

FIG. 8 shows a schematic block diagram of an example device 800 that can be used to implement embodiments of the present disclosure. For example, the data analysis system 110, the diagnostic analysis system 140, the analysis engine 125, and/or the diagnosis engine 145 as shown in FIG. 1 may be implemented by the device 800. As shown, the device 800 comprises a central processing unit (CPU) 801 that may perform various appropriate actions and processes according to computer program instructions stored in read only memory (ROM) 802 or loaded from storage unit 808 into a random access memory (RAM) 803. In the RAM 803, various programs and data required for the operation of the device 800 may also be stored. The CPU 801, the ROM 802, and the RAM 803 are connected to each other through a bus 804. An input/output (I/O) interface 805 is also coupled to the bus 804.

A plurality of components in the device 800 is connected to the I/O interface 805, including: an input unit 806, for example, a keyboard, a mouse, and the like; an output unit 807, for example, various kinds of displays and loudspeakers, and the like; a storage unit 808, such as a magnetic disk and an optical disk, and the like; and a communication unit 809, such as a network card, a modem, a wireless transceiver, and the like. The communication unit 809 allows the device 800 to exchange information/data with other devices via the computer network, such as Internet, and/or various telecommunication networks.

The above described process and processing, for example, the process 200 and/or the process 600, can also be performed by the processing unit 801. For example, in some embodiments, the process 200 and/or the process 600 may be implemented as a computer software program being tangibly included in the machine-readable medium, for example, the storage unit 808. In some embodiments, the computer program may be partially or fully loaded and/or mounted to the device 800 via the ROM 802 and/or communication unit 809. When the computer program is loaded to the RAM 803 and executed by the CPU 801, one or more steps of the above described the process 200 and/or the process 600 can be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible device that maintains and stores instructions utilized by the instruction executing devices. The computer-readable storage medium may be, but is not limited to, an electrical storage device, a magnetic storage device, an optical storage device, an electromagnetic storage device, a semiconductor storage device or any appropriate combination of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, a mechanical coding device, a punched card stored with instructions thereon, or a projection in a slot, and any appropriate combination of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include copper-transmitted cables, optical fiber transmissions, wireless transmissions, routers, firewalls, switches, network gate computers and/or edge servers. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combination of one or more programming languages, where the programming languages consist of object-oriented programming languages, e.g., Smalltalk, C++, and so on, and conventional procedural programming languages, such as "C" language or similar programming languages. The computer-readable program instructions may be implemented fully on a user computer, partially on the user computer, as an independent software package, partially on the user computer and partially on a remote computer, or completely on the remote computer or a server. In the case where a remote computer is involved, the remote computer may be connected to the user computer via any type of network, including a local area network (LAN) and a wide area network (WAN), or to the external computer (e.g., connected via Internet using an Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described herein with reference to a flow chart and/or block diagram of method, device (system) and computer program products according to embodiments of the present disclosure. It should be appreciated that each block of the flow chart and/or block diagram and the combination of various blocks in the flow chart and/or block diagram can be implemented by computer-readable program instructions.

The computer-readable program instructions may be provided to the processing unit of a general-purpose computer, dedicated computer or other programmable data processing devices to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architectures, functions and operations that may be implemented by a system, a method and a computer program product according to multiple implementations of the present disclosure. In this regard, each block in the flow chart or block diagram can represent a module, a portion of program segment or code, where the module and the portion of program segment or code include one or more executable instructions for performing stipulated logic functions. In some alternative implementations, it should be appreciated that the functions indicated in the block may also take place in an order different from the one indicated in the drawings. For example, two successive blocks may be in fact executed in parallel or sometimes in a reverse order depending on the involved functions. It should also be appreciated that each block in the block diagram and/or flow chart and combinations of the blocks in the block diagram and/or flow chart may be implemented by a hardware-based system exclusively for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method for diagnosing a data analysis system which is configured to implement image processing, the method comprising by one or more hardware processors:
    training a neural network of an analysis engine of the data analysis system based on probabilistic inference and characteristics of the analysis engine;
    reducing uncertainty of the neural network by retraining the neural network of the analysis engine based on determining that a metric of uncertainty, indicating a level of certainty for a prediction result obtained by processing data with the analysis engine, indicates that the neural network is uncertain;
    determining a diagnosis engine corresponding to the analysis engine based on information about the analysis engine by:
        in response to the information indicating that the analysis engine comprises a neural network module, constructing a neural network module based on the information;
        updating the neural network module with probabilistic inference, to obtain a probabilistic neural network module; and
        constructing the diagnosis engine to include the obtained probabilistic neural network module,
    wherein determining the diagnosis engine corresponding to the analysis engine based on the information comprises in response to the information indicating that the analysis engine fails to include the neural network module, constructing the diagnosis engine to include a pre-configured probabilistic neural network module.

2. The method of claim 1, wherein the diagnosis engine is configured to diagnose both training data and prediction data, and wherein the metric of uncertainty is provided based on:
    determining a total metric of uncertainty for the diagnosis engine by processing data to be diagnosed with the diagnosis engine; and
    providing, based on the total metric of uncertainty, at least one of the following: a metric of model uncertainty, a metric of data uncertainty, and a metric of distribution uncertainty,
    wherein the metric of model uncertainty at least indicates an impact of a fitting degree between complexity of the analysis engine and a scale of the data to be diagnosed on performance of the analysis engine,
    the metric of data uncertainty at least indicates an impact of a quality of the data to be diagnosed on performance of the analysis engine, and
    the metric of distribution uncertainty at least indicates an impact of a matching degree between a distribution of the prediction data and a distribution of the training data on performance of the analysis engine.

3. The method of claim 1, wherein an input of the diagnosis engine comprises a plurality of data items, the plurality of data items being associated with different features, respectively, and wherein providing the metric of uncertainty comprises:
    determining, based on the metric of uncertainty, a contribution of at least one of the plurality of data items to the metric of uncertainty.

4. The method of claim 3, further comprising:
    providing, based on the contribution, an indication of adjusting at least one of the plurality of data items.

5. The method of claim 2, further comprising:
    providing an indication of adjusting the analysis engine and the data to be diagnosed.

6. The method of claim 5, wherein providing an indication of adjusting the analysis engine and the data to be diagnosed comprises:
    providing the indication in response to the metric of uncertainty being greater than a predetermined threshold.

7. The method of claim 5, wherein the data to be diagnosed comprises both the training data and the prediction data, and wherein providing an indication of adjusting the analysis engine and the data to be diagnosed comprises:
    obtaining a first metric of uncertainty by processing the training data with the diagnosis engine;
    obtaining a second metric of uncertainty by processing the prediction data with the diagnosis engine; and
    providing an indication of adjusting the analysis engine and the data to be diagnosed based on a comparison of the first and second metrics of uncertainty.

8. A method for optimizing a data analysis system which is configured to implement image processing, the method comprising by one or more hardware processors:
    training a neural network of an analysis engine of the data analysis system based on probabilistic inference and characteristics of the analysis engine;
    reducing uncertainty of the neural network by retraining the neural network of the analysis engine based on determining that a metric of uncertainty, indicating a level of certainty for a prediction result obtained by processing data with the analysis engine, indicates that the neural network is uncertain;
    determining a diagnosis engine corresponding to the analysis engine based on information about the analysis engine by:
        in response to the information indicating that the analysis engine comprises a neural network module, constructing a neural network module based on the information;
        updating the neural network module with probabilistic inference, to obtain a probabilistic neural network module; and
        constructing the diagnosis engine to include the obtained probabilistic neural network module,
    wherein the diagnosis engine is configured to diagnose both training data and prediction data, and wherein the metric of uncertainty is provided based on:

determining a total metric of uncertainty for the diagnosis engine by processing data to be diagnosed with the diagnosis engine; and providing, based on the total metric of uncertainty, at least one of the following: a metric of model uncertainty, a metric of data uncertainty, and a metric of distribution uncertainty, wherein the metric of model uncertainty at least indicates an impact of a fitting degree between complexity of the analysis engine and a scale of the data to be diagnosed on performance of the analysis engine, wherein the metric of data uncertainty at least indicates an impact of a quality of the data to be diagnosed on performance of the analysis engine, wherein the metric of distribution uncertainty at least indicates an impact of a matching degree between a distribution of the prediction data and a distribution of the training data on performance of the analysis engine, wherein the method further comprises providing an indication of adjusting the analysis engine and the data to be diagnosed, and wherein the data to be diagnosed comprises both the training data and the prediction data, and wherein providing an indication of adjusting the analysis engine and the data to be diagnosed comprises:

obtaining a first metric of uncertainty by processing the training data with the diagnosis engine;

obtaining a second metric of uncertainty by processing the prediction data with the diagnosis engine; and providing an indication of adjusting the analysis engine and the data to be diagnosed based on a comparison of the first and second metrics of uncertainty.

9. The method of claim 8, wherein the metric of uncertainty comprises a metric of model uncertainty at least indicating an impact of a fitting degree between complexity of the analysis engine and a scale of the data to be diagnosed on performance of the analysis engine, and wherein the method further comprises:

in response to the metric being greater than a predetermined threshold, updating the analysis engine by training the analysis engine with additional training data.

10. The method of claim 9, wherein the metric of uncertainty comprises a metric of data uncertainty at least indicating an impact of a quality of the data, and wherein updating the analysis engine comprises:

in response to the metric of data uncertainty being greater than a predetermined threshold, discarding the data.

11. The method of claim 9, wherein the metric of uncertainty comprises a metric of distribution uncertainty at least indicating an impact of a matching degree between a distribution of prediction data and a distribution of the training data on performance of the analysis engine, and wherein updating the analysis engine comprises:

in response to the metric of distribution uncertainty being greater than a predetermined threshold, retraining the analysis engine with the prediction data.

12. The method of claim 8, wherein an input of the analysis engine comprises a plurality of data items, the plurality of data items being associated with different features, respectively, and the method further comprises:

determining a metric of feature uncertainty from the metric of uncertainty, the metric of feature uncertainty indicating a contribution of at least one of the plurality of data items to the metric of uncertainty.

13. The method of claim 12, wherein updating the analysis engine comprises:

in response to the metric of feature uncertainty being greater than a predetermined threshold, performing at least one of the following:

adding more data items into an input of the analysis engine;

modifying an attribute of a data item corresponding to a feature; and discarding at least one data item of the plurality of data items.

14. An electronic device, comprising:

at least one processing unit;

at least one memory coupled to the at least one processing unit and having instructions stored thereon executable by the at least one processing unit, the instructions, when executed by the at least one processing unit, causing the device to perform acts comprising:

training a neural network of an analysis engine of a data analysis system based on probabilistic inference and characteristics of the analysis engine of the data analysis system; and reducing uncertainty of the neural network by retraining the neural network of the analysis engine based determining that a metric of uncertainty, indicating a level of certainty for a prediction result obtained by processing data with the analysis engine, indicates that the neural network is uncertain, determining a diagnosis engine corresponding to the analysis engine based on information about the analysis engine by:

in response to the information indicating that the analysis engine comprises a neural network module, constructing a neural network module based on the information;

updating the neural network module with probabilistic inference, to obtain a probabilistic neural network module; and constructing the diagnosis engine to include the obtained probabilistic neural network module, wherein determining the diagnosis engine corresponding to the analysis engine based on the information comprises in response to the information indicating that the analysis engine fails to include the neural network module, constructing the diagnosis engine to include a pre-configured probabilistic neural network module.

15. The device of claim 14, wherein the diagnosis engine is configured to diagnose both training data and prediction data, and wherein the metric of uncertainty is provided based on:

determining a total metric of uncertainty for the diagnosis engine by processing data to be diagnosed with the diagnosis engine; and providing, based on the total metric of uncertainty, at least one of the following: a metric of model uncertainty, a metric of data uncertainty, and a metric of distribution uncertainty, wherein the metric of model uncertainty at least indicates an impact of a fitting degree between complexity of the analysis engine and a scale of the data to be diagnosed on performance of the analysis engine, the metric of data uncertainty at least indicates an impact of a quality of the data to be diagnosed on performance of the analysis engine, and the metric of distribution uncertainty at least indicates an impact of a matching degree between a distribution of the prediction data and a distribution of the training data on performance of the analysis engine.

16. The device of claim 14, wherein an input of the diagnosis engine comprises a plurality of data items, the plurality of data items being associated with different features, respectively, and wherein providing the metric of uncertainty comprises:

determining, based on the metric of uncertainty, a contribution of at least one of the plurality of data items to the metric of uncertainty.

\* \* \* \* \*